(12) United States Patent
Morrissey et al.

(10) Patent No.: US 7,243,435 B2
(45) Date of Patent: Jul. 17, 2007

(54) LEVEL DEVICE AND METHOD OF CALIBRATING A LEVEL VIAL

(75) Inventors: Kevin Marc Morrissey, Xenia, OH (US); Michael A. Stickelman, Vandalia, OH (US)

(73) Assignee: Trimble Navigation Limited, Sunnyvale, CA (US)

( * ) Notice: Subject to any disclaimer, the term of this patent is extended or adjusted under 35 U.S.C. 154(b) by 119 days.

(21) Appl. No.: 11/124,073

(22) Filed: May 6, 2005

(65) Prior Publication Data

US 2006/0248737 A1 Nov. 9, 2006

(51) Int. Cl.
*G01C 9/10* (2006.01)

(52) U.S. Cl. .............................. 33/365; 33/377; 33/379

(58) Field of Classification Search ................. 33/365, 33/379, 347–348, 370–371, 377, 451, 381–382, 33/384, 389
See application file for complete search history.

(56) References Cited

U.S. PATENT DOCUMENTS

| 4,862,595 | A | | 9/1989 | Drumright |
| 5,025,568 | A | | 6/1991 | Grimes |
| 5,406,714 | A | * | 4/1995 | Baker et al. .................. 33/382 |
| 5,604,987 | A | | 2/1997 | Cupp |
| 5,651,186 | A | * | 7/1997 | Lindner et al. ............... 33/377 |
| 5,709,034 | A | * | 1/1998 | Kohner ........................ 33/377 |
| 5,940,978 | A | * | 8/1999 | Wright et al. ................. 33/381 |
| 6,176,020 | B1 | | 1/2001 | Scarborough |
| 6,282,805 | B1 | | 9/2001 | Cosentino |
| 6,591,510 | B2 | | 7/2003 | Tacklind |
| 6,792,686 | B2 | * | 9/2004 | Krehel et al. ................. 33/382 |

* cited by examiner

*Primary Examiner*—Yaritza Guadalupe-McCall
(74) *Attorney, Agent, or Firm*—Dinsmore & Shohl LLP

(57) ABSTRACT

The level device includes a level body having a pair of orthogonal reference surfaces. A vial carrier on the level body holds the level vial such that it can be calibrated with respect to the reference surfaces by rotation about a pair of orthogonal axes, each of the orthogonal axes being perpendicular to the direction of elongation of the level vial. Adhesive fixes the position of the level vial with respect to the vial carrier and fixing the position of the vial carrier with respect to the level body. The vial carrier includes a vial support and a pivot for engaging the level body. When the vial is calibrated, it is rotated about a first axis perpendicular to the direction of elongation of the level vial, and about a second axis perpendicular to the direction of elongation of the level vial and perpendicular to the first axis.

21 Claims, 9 Drawing Sheets

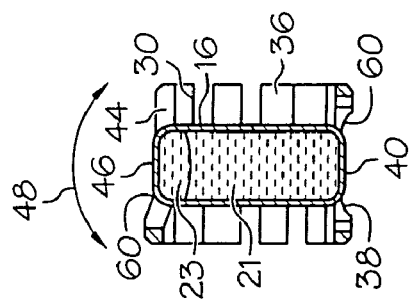
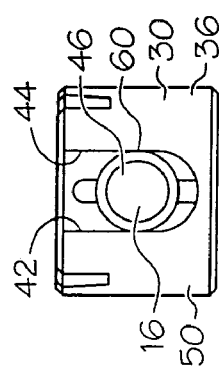
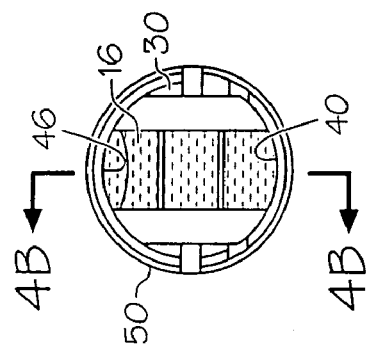
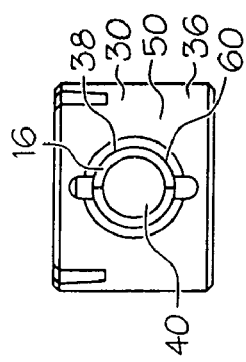
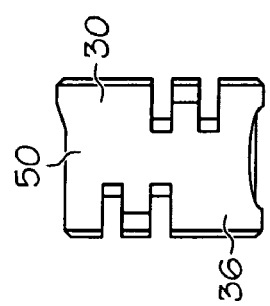

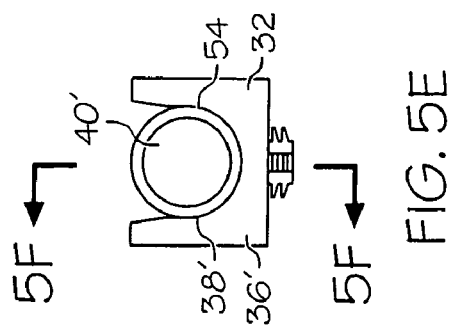
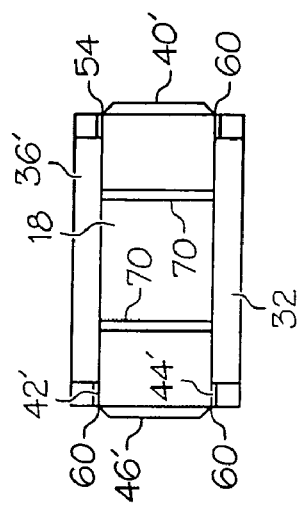
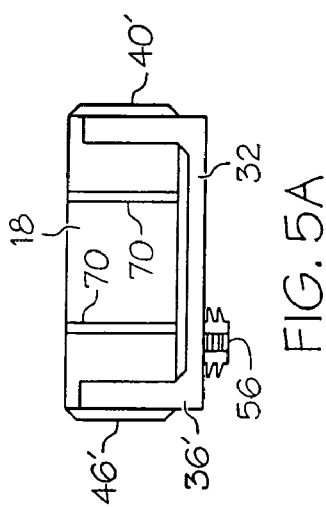
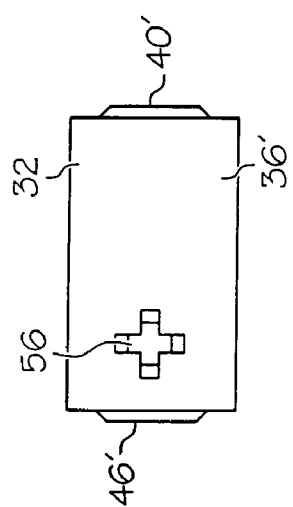

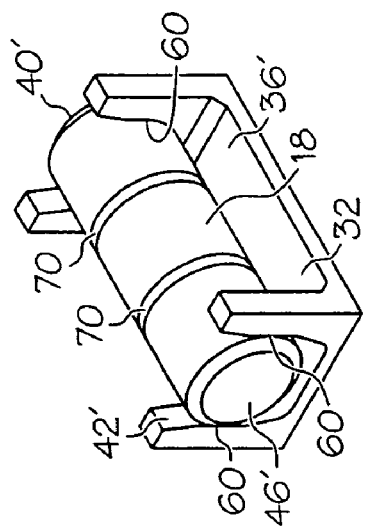
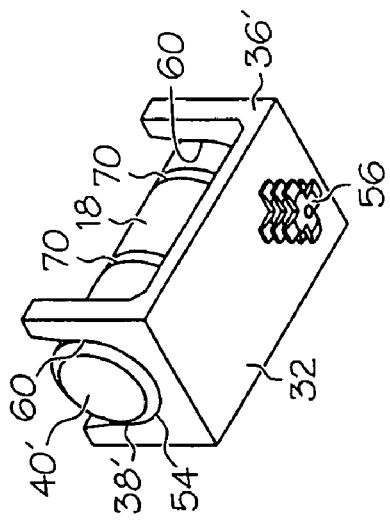
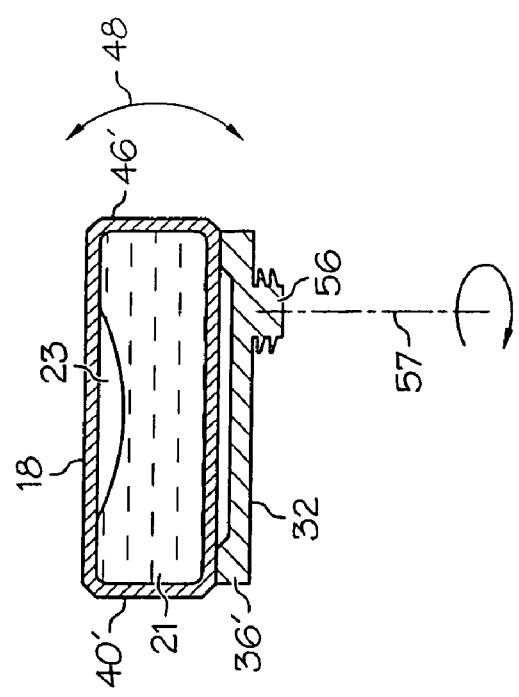

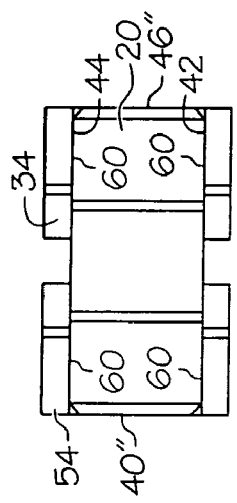
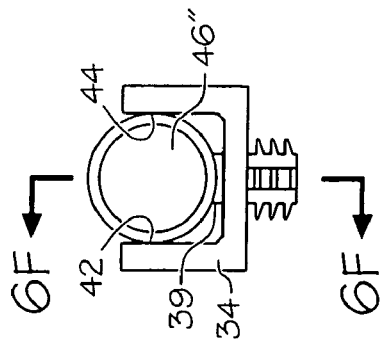
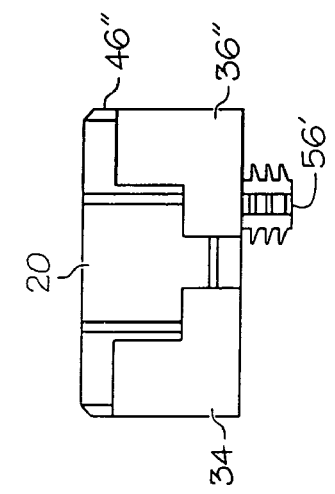
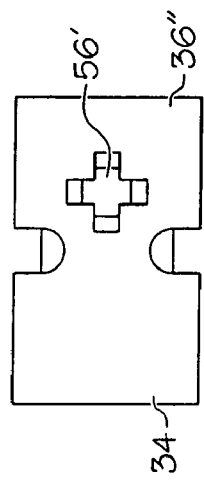
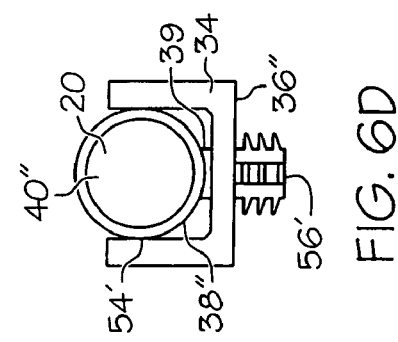

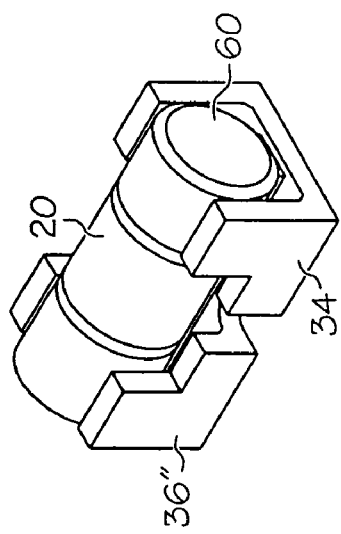
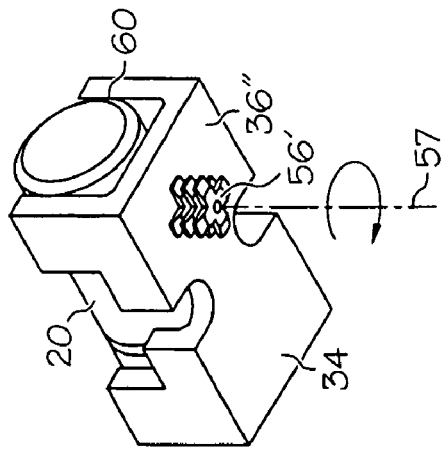
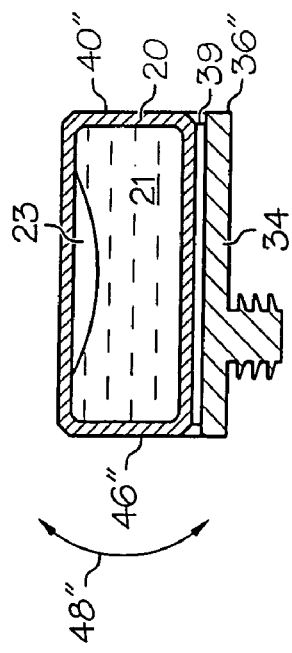

LEVEL DEVICE AND METHOD OF CALIBRATING A LEVEL VIAL

CROSS-REFERENCE TO RELATED APPLICATIONS

Not applicable.

Statement Regarding Federally Sponsored Research or Development

Not applicable.

BACKGROUND OF THE INVENTION

The present invention relates to an improved level device and a method of calibrating a level vial, carried by such a level device on a level body, with respect to reference surfaces defined by the level body.

Carpenter's levels and similar devices have long been used to determine whether a surface is level, i.e., horizontal, or vertical. Such level devices typically incorporate one or more level vials that are precisely oriented with respect to reference surfaces defined by the body of the level device. The typical level vial used in such level devices comprises an outer, transparent shell of glass or plastic defining an elongated cavity that has a slightly curved upper surface which is higher at the center than at the ends. The cavity is filled with a fluid, such as for example water, and a small bubble of air that floats on top of the fluid. When the vial is horizontal, the bubble will be in the middle of the vial. Typically, a pair of reference marks or bands are provided on the outer surface of the vial to assist the observer in assessing the position of the bubble. Assuming that the vial is properly calibrated with respect to a reference surface of the level body, the position of the bubble provides an indication as to the orientation of the reference surface. If the direction of elongation of the level vial is parallel to the reference surface of the level, the level can be used to determine whether a surface against which the reference surface is placed is horizontal. Similarly, if the direction of elongation of the level vial is perpendicular to the reference surface of the level, the level can be used to determine whether the reference surface is vertical. Some prior art levels use three level vials oriented at right angles to provide orientation information simultaneously with respect to at least two axes.

It will be appreciated that it is important for a level vial in such a level device to be positioned precisely with respect to a reference surface. However, proper calibration of the level vial can be somewhat difficult to achieve, especially if the vial is to be calibrated with respect to two reference surfaces. Additionally, it is important that calibration be accomplished quickly and inexpensively.

Accordingly, it is seen that there is a need for an improved level device and for a method of calibrating a level vial in such a device.

SUMMARY OF THE INVENTION

These needs are met by a level device having a level body, and a method of calibrating an elongated level vial in such a device with respect to two orthogonal reference surfaces on the level body. The level vial has a transparent hollow body defining a sealed cavity that is partially filled with fluid to define a fluid bubble. The bubble provides an indication that the vial is level in its direction of elongation when the fluid bubble comes to rest at a reference point on the vial. The method includes the steps of providing a level body that defines two orthogonal reference surfaces, providing a vial carrier on the level body, the vial carrier being capable of holding a level vial, positioning an elongated level vial in the vial carrier, placing a first reference surface of the level body in contact with a calibration surface, adjusting the position of the vial with respect to the vial carrier by rotating the vial about a first adjustment axis perpendicular to the direction of elongation of the vial, rotating the level body by substantially 90 degrees about an axis parallel to the direction of elongation of the vial, placing a second reference surface of the level body in contact with a calibration surface, and adjusting the position of the vial by rotating the vial carrier about a second adjustment axis perpendicular to both the direction of elongation and the first adjustment axis.

The method may further include the step of fixing the position of the vial with respect to the vial carrier after adjusting the position of the vial. The method may also include the step of fixing the position of the vial carrier with respect to the level body after adjusting the position of the vial by rotating the vial carrier about a second adjustment axis. The vial and vial carrier may be fixed in position by adhesively bonding the vial and vial carrier. They may also be secured by fasteners.

The method of calibrating may include the steps of placing a first reference surface of the level body in contact with a calibration surface, adjusting the position of the vial by rotating the vial carrier about a first adjustment axis perpendicular to the direction of elongation, rotating the level body by substantially 90 degrees about an axis parallel to the direction of elongation of the vial, placing a second reference surface of the level body in contact with a calibration surface, and adjusting the position of the vial with respect to the vial carrier by rotating the vial about a second adjustment axis perpendicular to both the direction of elongation of the vial and the first adjustment axis.

The level device according to the present invention includes a level body having a pair of orthogonal reference surfaces. An elongated level vial is calibrated with respect to the pair of orthogonal reference surfaces. A vial carrier on the level body holds the level vial such that it can be calibrated by rotation about a pair of orthogonal axes, each of the orthogonal axes being perpendicular to the direction of elongation of the level vial. Adhesive fixes the position of the level vial with respect to the vial carrier and the position of the vial carrier with respect to the level body. The vial carrier includes a vial support defining a cradle for engaging a first end of the level vial, and a frictional engagement for frictionally engaging the second end of the level vial such that during calibration the level vial may be rotated about a first axis perpendicular to the direction of elongation of the level vial. A vial carrier comprises a pivot for engaging the level body such that the level vial may be rotated about a second axis perpendicular to the direction of elongation of the level vial and perpendicular to the first axis.

The level device may include three, substantially orthogonal, elongated level vials calibrated with respect to the pair of orthogonal reference surfaces, and three vial carriers on the level body, each of the vial carriers holding a respective one of the three, substantially orthogonal elongated level vials. An adhesive fixes the position of each level vial with respect to its associated vial carrier and fixes the position of each vial carrier with respect to the level body. Each vial carrier includes a vial support and a pivot for engaging the level body. The vial support defines a cradle for engaging a first end of the level vial, and a frictional engagement for frictionally engaging the second end of the level vial. The level vial may be rotated about a first axis perpendicular to the direction of elongation of the level vial. The pivot engages the level body such that the level vial may be rotated about a second axis perpendicular to the direction of elongation of the level vial and parallel to the other of the orthogonal surfaces. The level device may further include a light source for projecting a reference beam of light in a direction parallel to one of the three vials. The pivot may comprise a post which engages an opening in said level body. Alternatively, the pivot may comprise an outer, cylindrical surface on the level carrier which permits the carrier to be received into a cylindrical opening in said level body and rotated with respect to said level body.

Accordingly, it is an object of the present invention to provide an improved level device having a pair of reference surfaces, and to provide a method and apparatus by which level vials in such a device can be calibrated about two axes.

BRIEF DESCRIPTION OF THE DRAWINGS

FIG. 4A is a side view of a vial carrier and vial;

FIG. 4B is a sectional view of the vial carrier and vial, taken along line 4B-4B in FIG. 4A;

FIG. 4C is a bottom view of the vial carrier and vial of FIG. 4A;

FIG. 4D is a top view of the vial carrier and vial of FIG. 4A;

FIG. 4E is a side view of the vial carrier and vial of FIG. 4A;

FIG. 5A is a side view of a vial carrier and vial;

FIG. 5B is a bottom view of the vial carrier and vial of FIG. 5A;

FIG. 5C is a top view of the vial carrier and vial of FIG. 5A;

FIG. 5D is an end view of the vial carrier and vial of FIG. 5A;

FIG. 5E is an opposite end view of the vial carrier and vial of FIG. 5A;

FIG. 5F is a sectional view of the vial carrier and vial of FIG. 5A, taken generally along line 5F-5F in FIG. 5E;

FIG. 5G is a perspective view of the vial carrier and vial of FIG. 5A;

FIG. 5H is a perspective view of the vial carrier and vial of FIG. 5A;

FIG. 6A is a side view of a vial carrier and vial;

FIG. 6B is a bottom view of the vial carrier and vial of FIG. 6A;

FIG. 6C is a top view of the vial carrier and vial of FIG. 6A;

FIG. 6D is an end view of the vial carrier and vial of FIG. 6A;

FIG. 6E is an opposite end view of the vial carrier and vial of FIG. 6A;

FIG. 6F is a sectional view of the vial carrier and vial of FIG. 6A, taken generally along line 6F-6F in FIG. 6E;

FIG. 6G is a perspective view of the vial carrier and vial of FIG. 6A; and

FIG. 6H is a perspective view of the vial carrier and vial of FIG. 6A.

DETAILED DESCRIPTION OF THE INVENTION

Figure 1:
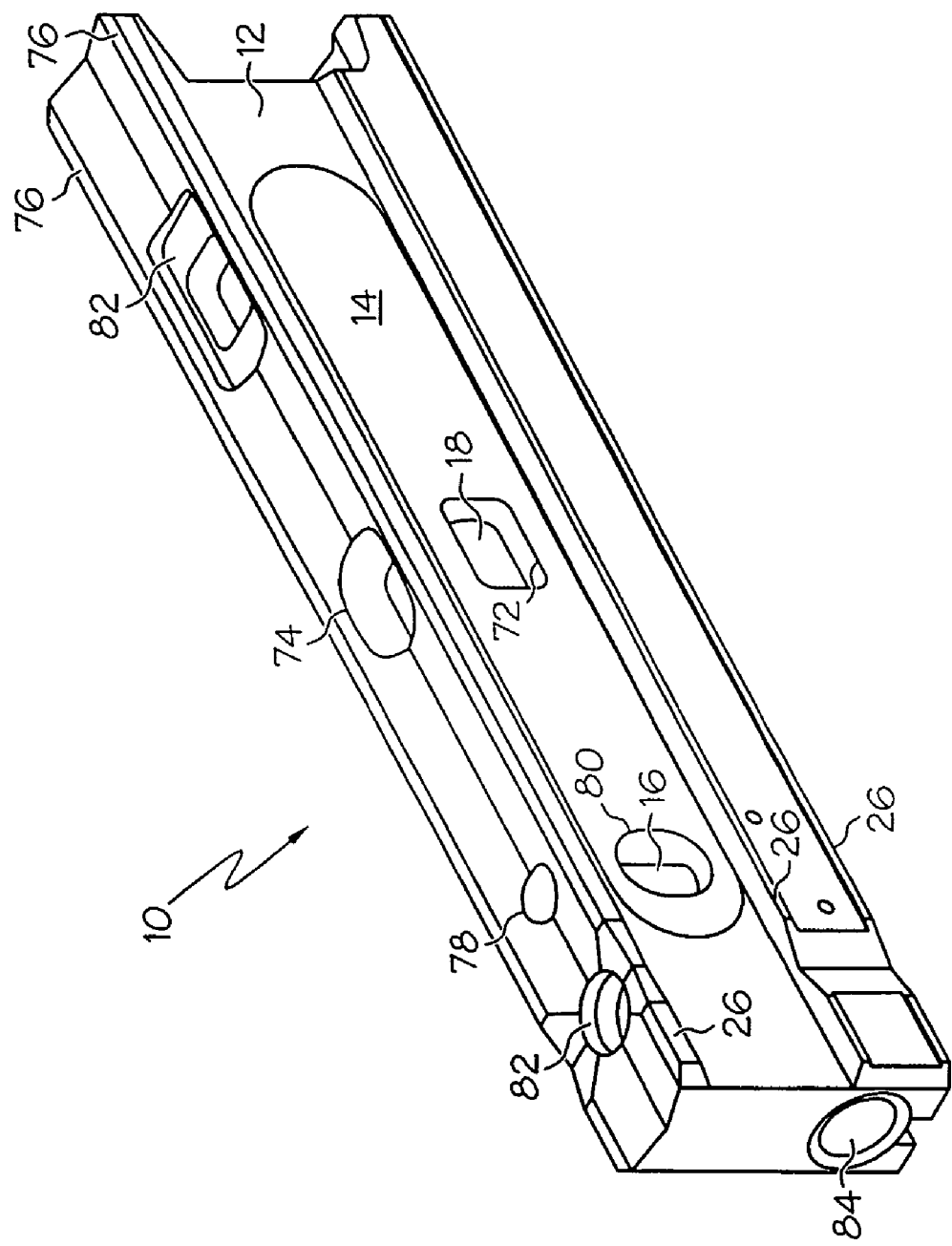
FIG. 1 is a perspective view showing a level device according to the present invention.
Figure 2:
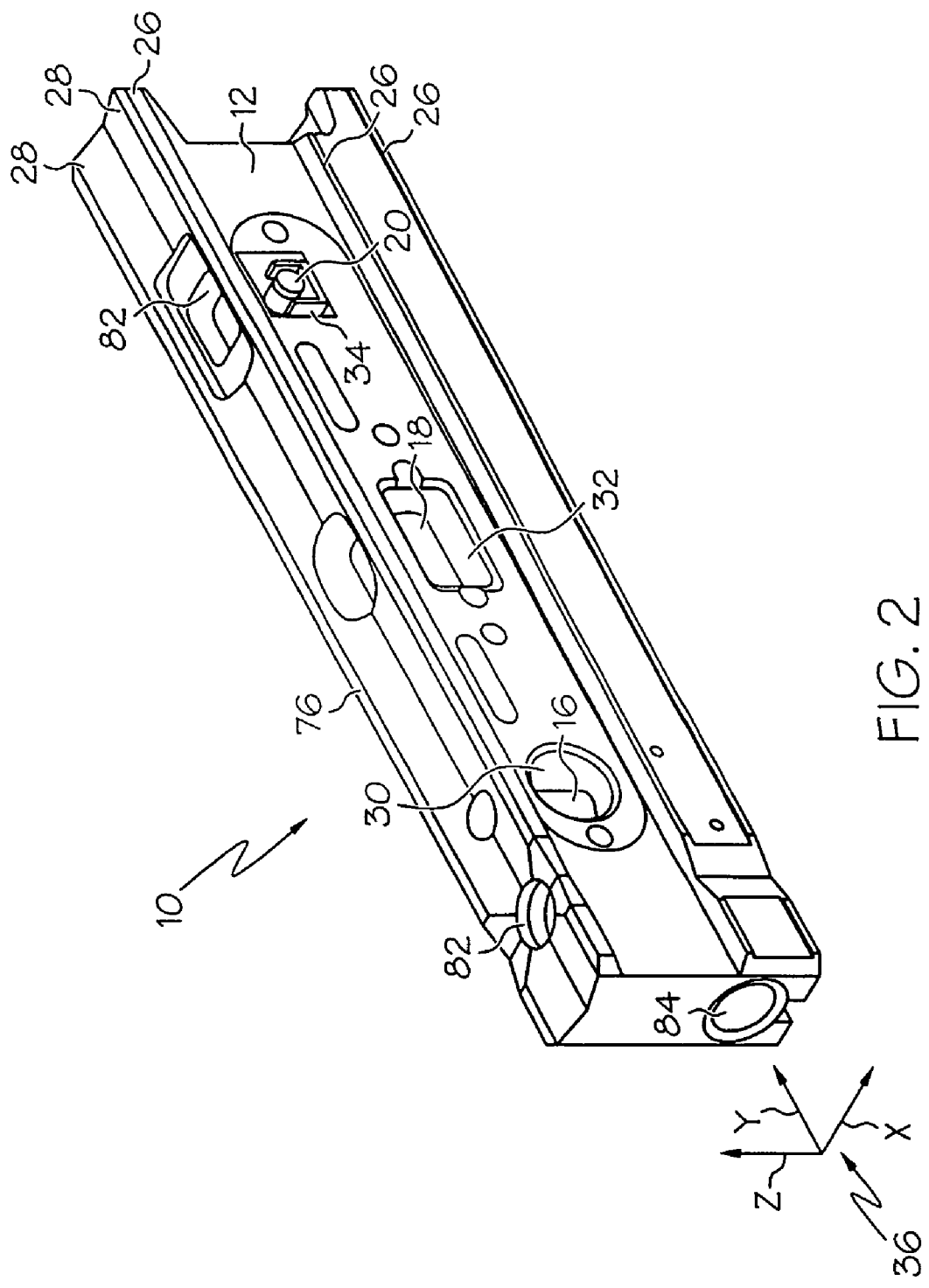
FIG. 2 is a perspective view of the level device of FIG. 1 with a cover plate removed.
Figure 3:
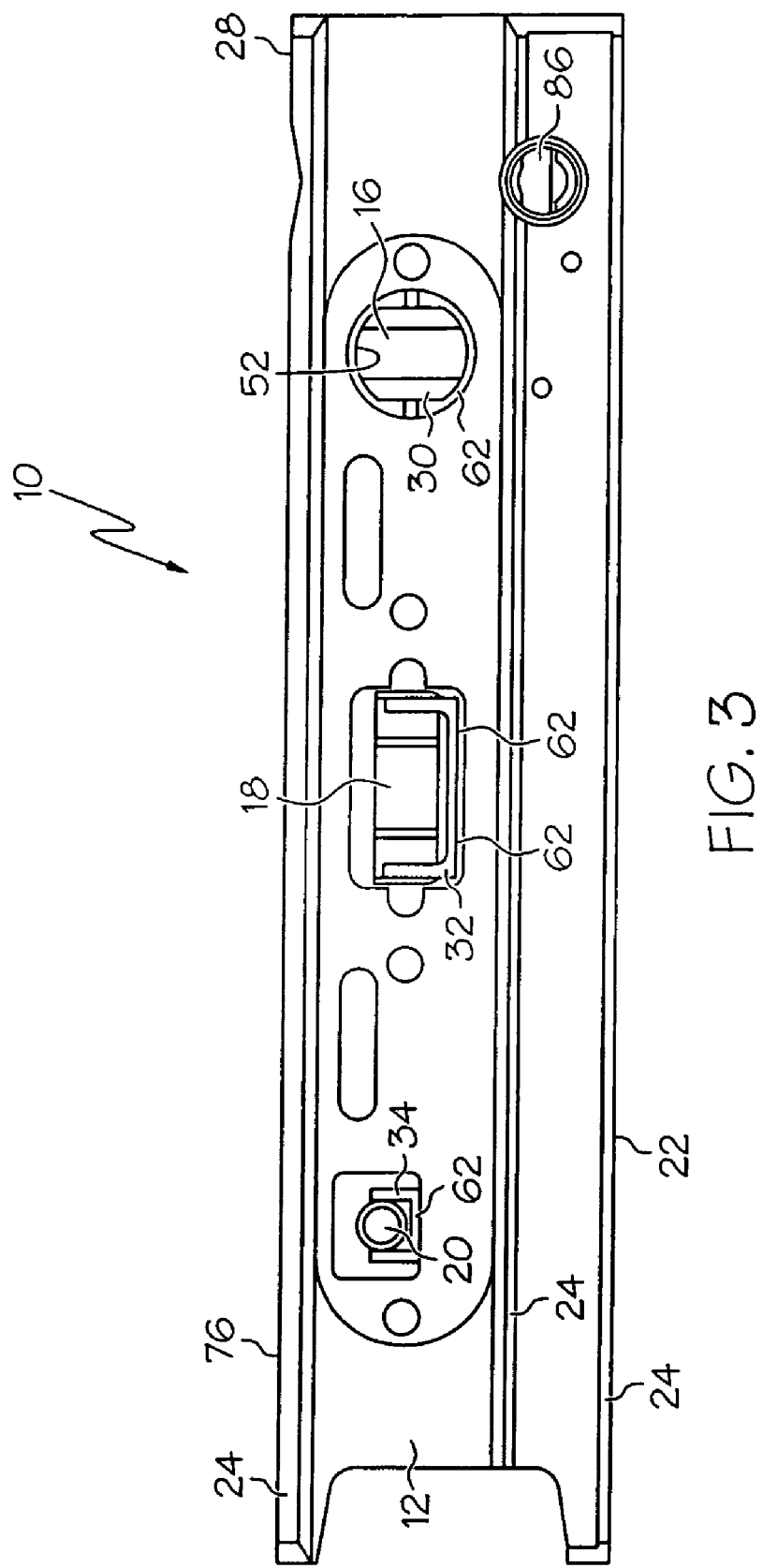
FIG. 3 is a side view of the level device of FIG. 1 with a cover plate removed.

Reference is now made to FIGS. 1-3 of the drawings, which show a level device 10 constructed in accordance with the present invention. The level device 10 includes a level body 12 having a pair of cover plates 14 (only one of which is shown) affixed to either side. FIGS. 2 and 3 show the level device 10 with the cover plates 14 removed so as to reveal interior structure for mounting and calibrating level vials 16, 18, and 20. It will be noted that FIGS. 2 and 3 show opposite sides of the level device 10. The level body 12 defines a pair of orthogonal reference surfaces 22 and 24, as well as additional reference surfaces 26 and 28.

Figure 4G:
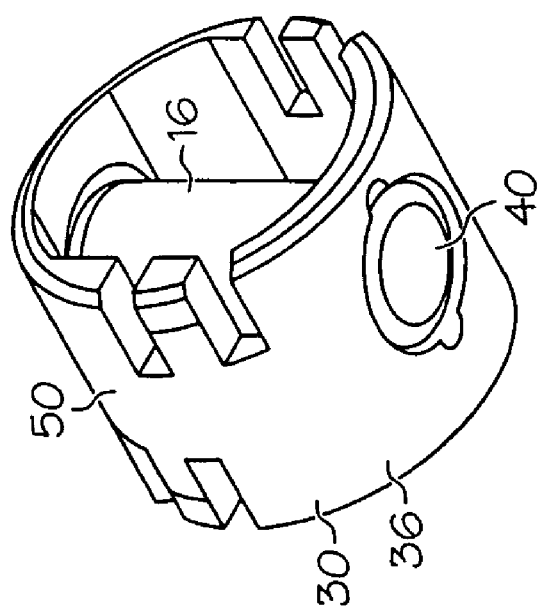
FIG. 4G is a perspective view of the vial carrier and vial of FIG. 4A.
Figure 4F:
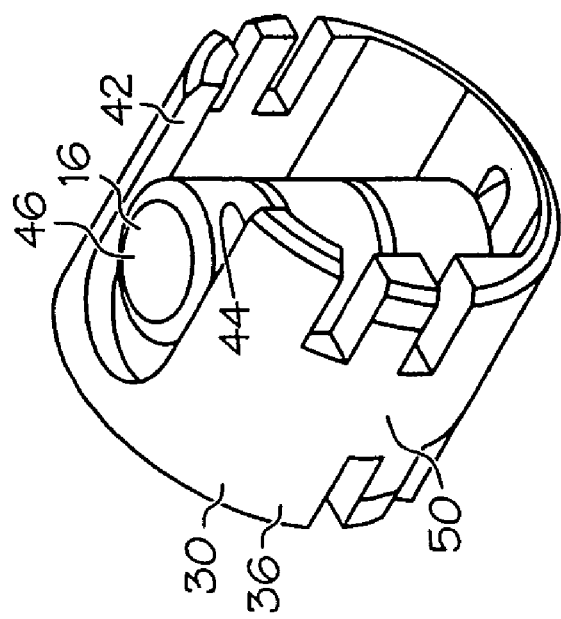
FIG. 4F is a perspective view of the vial carrier and vial of FIG. 4A.

As is well known, the level vials 16, 18, and 20 each have a transparent hollow body that defines a sealed cavity. As shown in FIGS. 4B, 5F, and 6F, the cavities are partially filled with fluid 21, so that bubbles of air 23 are also defined within the cavities. The bubble 23 naturally floats at the top of a cavity and provides an indication of the orientation of the level vial. More specifically, the bubble 23 provides an indication of which of the two ends of the elongated level vial is the most elevated or an indication that the level vial is precisely horizontal and its ends are at the same elevation.

The level vials 16, 18, and 20 are intended to be oriented, or calibrated, precisely with respect to the orthogonal reference surfaces 22, 24, 26 and 28. A vial carrier is provided on the level body 12 for holding each of the level vials 16, 18, and 20. More specifically, level vial 16 is held by vial carrier 30, level vial 18 is held by vial carrier 32, and level vial 20 is held by vial carrier 34. Each vial carrier holds its associated level vial such that the level vial may be calibrated by rotation about a pair of orthogonal adjustment axes, each of the orthogonal adjustment axes being perpendicular to the direction of elongation of the level vial. For example, with reference to axes 36 shown in FIG. 2, vial 16, extending parallel to the Z axis, may be rotated about adjustment axes parallel to the X and Y axes. Vial 18, extending parallel to the Y axis, may be rotated about adjustment axes parallel to the X and Z axes. And finally, vial 20, extending parallel to the X axis, may be rotated about adjustment axes parallel to the Y and Z axes.

During the assembly and calibration process, after the level vials are calibrated, adhesive is used to fix the position of each level vial 16, 18, 20 with respect to its vial carrier 30, 32, 34, and the position of each vial carrier 30, 32, 34 with respect to the level body 12, and the respective reference surfaces defined by the level body 12.

FIGS. 4A-4G show vial carrier 30 in greater detail. The vial carrier 30 comprises a vial support 36 defining a cradle 38 for engaging a first end 40 of the level vial 16. The cradle 38 takes the form of an opening in support 36 that is appropriately sized to receive first end 40 of the level vial 16. The vial carrier further comprises a frictional engagement defined by surfaces 42 and 44 that frictionally engage the second end 46 of the level vial 16. As indicated by arrow 48, during calibration the level vial 16 may be rotated about a first axis that is perpendicular to the direction of elongation of the level vial 16. This rotation is accomplished by movement of end 46 between surfaces 42 and 44 while end 40 is held relatively stationary in the cradle 38. The vial carrier 30 further comprises a pivot, defined by cylindrical surface 50 for engaging cylindrical opening 52 in the level body 12. The level vial 16 may be rotated with the vial carrier 30 about a second axis that is perpendicular to the direction of elongation of the level vial 16 and also perpendicular to the first axis.

FIGS. 5A-5H show vial carrier 32 in greater detail. The vial carrier 32 comprises a vial support 36' defining a cradle 38' for engaging a first end 40' of the level vial 18. The cradle 38' takes the form of a U-shaped yoke 54 in support 36' that is appropriately sized to receive first end 40' of the level vial 18. The vial carrier further comprises a frictional engagement defined by surfaces 42' and 44' that frictionally engage the second end 46' of the level vial 18. As indicated by arrow 48', during calibration the level vial 18 may be rotated about a first axis that is perpendicular to the direction of elongation of the level vial 18. This rotation is accomplished by movement of end 46' between surfaces 42' and 44' while end 40' is held relatively stationary in the cradle 38'. The vial carrier 32 further comprises a pivot, defined by pivot post 56 that engages a cylindrical opening in the level body 12. The level vial 18 may be rotated with the vial carrier 32 about a second axis 57 that is perpendicular to the direction of elongation of the level vial 18 and also perpendicular to the first axis.

FIGS. 6A-6H show vial carrier 34 in greater detail. The vial carrier 32 comprises a vial support 36" defining a cradle 38" including a support nub 39 for engaging a first end 40" of the level vial 20. The cradle 38" takes the form of a U-shaped yoke 54' in support 36" that is appropriately sized to receive first end 40" of the level vial 20. The vial carrier further comprises a frictional engagement defined by surfaces 42" and 44" that frictionally engage the second end 46" of the level vial 20. As indicated by arrow 48", during calibration the level vial 20 may be rotated about a first axis that is perpendicular to the direction of elongation of the level vial 20. This rotation is accomplished by movement of end 46" between surfaces 42" and 44" while end 40" is held relatively stationary in the cradle 38". The vial carrier 34 further comprises a pivot, defined by pivot post 56' that engages a cylindrical opening in the level body 12. The level vial 20 may be rotated with the vial carrier 34 about a second axis 57' that is perpendicular to the direction of elongation of the level vial 20 and also perpendicular to the first axis.

The relative positions of the vials 16, 18 and 20 with regard to the level body 12 are fixed by the simple expedient of an adhesive. A small amount of adhesive at 60, preferably clear adhesive for esthetic purposes, holds the level vials 16, 18, and 20 in fixed position with respect to their respective vial carriers 30, 32, and 34. Similarly, a small amount of adhesive at 62 holds the carriers 30, 32, and 34 in fixed position with respect to the level body 12.

The level device 10, described above, is constructed in such a way that the calibration of the level vials is facilitated. Each elongated level vial 16, 18, and 20 is calibrated with respect to two orthogonal reference surfaces on the level body 12, such as for example reference surfaces 22 and 26. As an example with respect to vial 18 and vial carrier 32, the level body 12 is placed on a calibration surface which is horizontal (with respect to gravity) with the reference surface 22 in contact with the reference surface, in the orientation shown in FIG. 2. The position of the vial 18 is adjusted with respect to the vial carrier 32 by rotating the vial 18 about a first adjustment axis (generally parallel to the X axis), perpendicular to the direction of elongation of the vial 18, as indicated by arrow 48' in FIG. 5F. The position of the vial is adjusted until the bubble 23 in the vial 18 is centered between lines 70. The position of the bubble may be observed through either of openings 72 or 74. The level body 12 is then rotated by substantially 90 degrees about an axis parallel to the direction of elongation of the vial (the Y axis in FIG. 2), placing a second reference surface 24 of the level body 12 in contact with a calibration surface which is substantially horizontal with respect to gravity. Next the position of the vial 18 is adjusted by rotating the vial carrier 62 about a second adjustment axis, perpendicular to both the direction of elongation and the first adjustment axis. If the reference axes 36 are rotated in FIG. 2 along with the 90 degree rotation of the level body 12, the second adjustment axis is parallel to the Z axis. At this point the position of the vial on the carrier and carrier on the level body are preferably fixed in position with small amounts of adhesive. The vial is now calibrated to two reference surfaces through two independent calibration steps.

It will be appreciated that the order of the steps in the calibration process described above may be varied. That is, the level body may be initially placed with reference surface 24 in contact with a calibration surface and the vial carrier 32 rotated with respect to the body, and then level body 12 rotated about the Y axis by 90 degrees before the vial 18 is rotated with respect to the vial carrier 32. Adhesive may be applied to appropriate parts after each adjustment step, or applied to all of the parts after all adjustment steps are completed. It will also be appreciated that all three of the vials 16, 18, and 20, may be adjusted in position, and thus properly calibrated, in just three positions of the level body—a first position in which surface 22 is horizontal, a second position in which surface 24 is horizontal, and a third position in which one of surfaces 22 and 24 is held in a vertical position against a vertical calibration surface. Since surfaces 24 and 26 are parallel, either may be used in the calibration process. Further, the surface 22 and surface 28 are parallel and may be used interchangeably during calibration.

It will be noted that vial 16 may be viewed through opening 78 or opening 80, depending upon which is most convenient for the user. Because of its orientation, vial 20 is viewable only through opening 82.

It will be appreciated that the level device of the present invention will have numerous uses. These uses may be expanded by including a source of light, such as for example a light emitting diode source, that transmits beams of light along one, two or all three of the axes X, Y, and Z of the level body 12. For example, reference beams may be projected vertically and horizontally from openings 82, 84, and 86.

While certain representative embodiments and details have been shown for purposes of illustrating the invention, it will be apparent to those skilled in the art that various changes in the invention disclosed herein may be made without departing from the scope of the invention, which is defined in the appended claims.

What is claimed:

1. A method of calibrating an elongated level vial with respect to two reference surfaces of a level body on which the vial is mounted, said surfaces being orthogonal with respect to each other, and said level vial having a transparent hollow body defining a sealed cavity partially filled with fluid so as to define a fluid bubble, said bubble providing an indication that said vial is level in its direction of elongation when said fluid bubble comes to rest at a mid-point of said vial, comprising the steps of:

providing a level body, said level body defining two orthogonal reference surfaces, providing a vial carrier on said level body, said vial carrier holding a level vial, placing a first reference surface of said level body in contact with a calibration surface, adjusting the position of said vial with respect to said vial carrier by rotating the vial about a first adjustment axis perpendicular to said direction of elongation of said vial, rotating said level body by substantially 90 degrees about an axis parallel to said direction of elongation of said vial, placing a second reference surface of said level body in contact with a calibration surface, and adjusting the position of said vial by rotating said vial carrier about a second adjustment axis perpendicular to both said direction of elongation and said first adjustment axis.

2. The method of calibrating an elongated level vial with respect to two reference surfaces of a level body according to claim 1, comprising the further step of fixing the position of said vial with respect to said vial carrier after adjusting the position of said vial with respect to said vial carrier.

3. The method of calibrating an elongated level vial with respect to two reference surfaces of a level body according to claim 2, in which the step of fixing the position of said vial with respect to said vial carrier comprises the step of adhesively bonding said vial in position with respect to said vial carrier.

4. The method of calibrating an elongated level vial with respect to two reference surfaces of a level body according to claim 1, comprising the further step of fixing the position of said vial carrier with respect to said level body after adjusting the position of said vial by rotating said vial carrier about a second adjustment axis.

5. The method of calibrating an elongated level vial with respect to two reference surfaces of a level body according to claim 4, in which the step of fixing the position of said vial carrier with respect to said level body after adjusting the position of said vial by rotating said vial carrier about a second adjustment axis comprises the step of adhesively bonding said vial carrier in position with respect to said level body.

6. A method of calibrating an elongated level vial with respect to two reference surfaces of a level body on which the vial is mounted, said surfaces being orthogonal with respect to each other, and said level vial having a transparent hollow body defining a sealed cavity partially filled with fluid so as to define a fluid bubble, said bubble providing an indication that said vial is level in its direction of elongation when said fluid bubble comes to rest at a mid-point of said vial, comprising the steps of:

providing a level body, said level body defining two orthogonal reference surfaces, providing a vial carrier on said level body, said vial carrier holding an elongated level vial, placing a first reference surface of said level body in contact with a calibration surface, adjusting the position of said vial by rotating said vial carrier about a first adjustment axis perpendicular to said direction of elongation, rotating said level body by substantially 90 degrees about an axis parallel to said direction of elongation of said vial, placing a second reference surface of said level body in contact with a calibration surface, and adjusting the position of said vial with respect to said vial carrier by rotating the vial about a second adjustment axis perpendicular to both said direction of elongation of said vial and said first adjustment axis.

7. The method of calibrating an elongated level vial with respect to two reference surfaces of a level body according to claim 6, comprising the further step of fixing the position of said vial with respect to said vial carrier after adjusting the position of said vial with respect to said vial carrier.

8. The method of calibrating an elongated level vial with respect to two reference surfaces of a level body according to claim 7 in which the step of fixing the position of said vial with respect to said vial carrier comprises the step of adhesively bonding said vial in position with respect to said vial carrier.

9. The method of calibrating an elongated level vial with respect to two reference surfaces of a level body according to claim 8, in which the step of fixing the position of said vial with respect to said vial carrier and the position of said vial carrier with respect to said level body comprises the step of fixing the position of said vial and the position of said vial carrier by adhesively bonding said vial in position with respect to said vial carrier, and adhesively bonding said vial carrier in position with respect to said level body.

10. The method of calibrating an elongated level vial with respect to two reference surfaces of a level body according to claim 6, comprising the further step of fixing the position of said vial carrier with respect to said level body after adjusting the position of said vial by rotating said vial carrier about a second adjustment axis.

11. The method of calibrating an elongated level vial with respect to two reference surfaces of a level body according to claim 10, in which the step of fixing the position of said vial carrier with respect to said level body after adjusting the position of said vial by rotating said vial carrier about a second adjustment axis comprises the step of adhesively bonding said vial carrier in position with respect to said level body.

12. A method of calibrating an elongated level vial with respect to two reference surfaces of a level body on which the vial is mounted, said surfaces being orthogonal with respect to each other, and said level vial having a transparent hollow body defining a sealed cavity partially filled with fluid so as to define a fluid bubble, said bubble providing an indication that said vial is level in its direction of elongation when said fluid bubble comes to rest at a mid-point of said vial, comprising the steps of:

providing a level body, said level body defining two orthogonal reference surfaces, providing a vial carrier on said level body, said vial carrier holding a level vial, adjusting the position of said vial with respect to said two orthogonal reference surfaces by rotating said vial about two orthogonal adjustment axes, each such axes also being perpendicular to the direction of elongation of said vial, when said reference surfaces are successively brought into contact with respective calibration surfaces, said vial being rotated about one adjustment axis by rotation of said vial with respect to said vial carrier and being rotated about the other of said adjustment axes by rotation of said vial holder with respect to said level body.

13. The method of calibrating an elongated level vial with respect to two reference surfaces of a level body according to claim 12, comprising the further step of fixing the position of said vial with respect to said vial carrier and the position of said vial carrier with respect to said level body.

14. A level device, comprising:
a level body having a pair of orthogonal reference surfaces,
an elongated level vial calibrated with respect to said pair of orthogonal reference surfaces, said level vial having a transparent hollow body defining a sealed cavity partially filled with fluid, said fluid defining a bubble providing an indication of the orientation of the level vial,
a vial carrier on said level body, said vial carrier holding said level vial such that said level vial may be calibrated by rotation about a pair of orthogonal axes, each of said orthogonal axes being perpendicular to the direction of elongation of said level vial, and
adhesive fixing the position of said level vial with respect to said vial carrier and fixing the position of said vial carrier with respect to said level body.

15. The level device of claim 14 in which said vial carrier comprises a vial support defining a cradle for engaging a first end of the level vial, and a frictional engagement for frictionally engaging the second end of the level vial such that during calibration said level vial may be rotated about a first axis perpendicular to the direction of elongation of said level vial.

16. The level device of claim 14 in which vial carrier comprises a pivot for engaging the level body such that said level vial may be rotated about a second axis perpendicular to the direction of elongation of said level vial and perpendicular to the first axis.

17. A level device, comprising:
a level body having a pair of orthogonal reference surfaces,
three, substantially orthogonal elongated level vials calibrated with respect to said pair of orthogonal reference surfaces, said level vials each having a transparent hollow body defining a sealed cavity partially filled with fluid, said fluid defining a bubble providing an indication of the orientation of the level vial,
three vial carriers on said level body, each of said vial carriers holding a respective one of said three, substantially orthogonal elongated level vials such that said level vials may each be calibrated by rotation about a pair of orthogonal axes, each of said pair of orthogonal axes being perpendicular to the direction of elongation of the associated level vial, and
adhesive fixing the position of each level vial with respect to its associated vial carrier and fixing the position of each vial carrier with respect to said level body.

18. The level device of claim 17 further comprising a light source for projecting a reference beam of light in a direction parallel to one of said three vials.

19. A vial carrier for holding an elongated level vial on a level device, in which the level has a level body defining a pair of orthogonal reference surfaces, comprising:
a vial support defining a cradle for engaging a first end of the level vial, and a frictional engagement for frictionally engaging the second end of the level vial such that said level vial may be rotated about a first axis perpendicular to the direction of elongation of said level vial and parallel to one of said orthogonal reference surfaces, and
a pivot for engaging the level body such that said level vial may be rotated about a second axis perpendicular to the direction of elongation of said level vial and parallel to the other of said orthogonal surfaces.

20. The vial carrier of claim 19 in which said pivot comprises a post which engages an opening in said level body.

21. The vial carrier of claim 19 in which said pivot comprises an outer, cylindrical surface on the carrier body which permits the carrier to be received into a cylindrical opening in said level body and rotated with respect to said level body.

* * * * *